(12) United States Patent
Benedetti et al.

(10) Patent No.: US 7,334,971 B2
(45) Date of Patent: Feb. 26, 2008

(54) EXTRACTOR DEVICE FOR MACHINE TOOLS, WELDING AND MANUFACTURING MACHINES AND THE LIKE

(75) Inventors: Michele Benedetti, Bologna (IT); Giorgio Tabellini, Sasso Marconi (IT)

(73) Assignee: P.E.I. Protezioni Elaborazioni Industriali S.r.l., Calderara Di Reno (IT)

( * ) Notice: Subject to any disclaimer, the term of this patent is extended or adjusted under 35 U.S.C. 154(b) by 0 days.

(21) Appl. No.: 11/802,442

(22) Filed: May 23, 2007

(65) Prior Publication Data

US 2007/0274798 A1 Nov. 29, 2007

(30) Foreign Application Priority Data

May 26, 2006 (IT) .......................... BO2006A0415

(51) Int. Cl.
*B23Q 11/00* (2006.01)
(52) U.S. Cl. .................. 409/137; 408/67; 451/456
(58) Field of Classification Search ................ 409/137, 409/135–136, 134; 408/67; 144/252.1, 144/252.2; 451/456; 219/121.33
See application file for complete search history.

(56) References Cited

U.S. PATENT DOCUMENTS

| | | | | |
|---|---|---|---|---|
| 3,646,712 A | * | 3/1972 | Quintana | 451/456 |
| 4,946,322 A | * | 8/1990 | Colligan | 409/137 |
| 5,474,116 A | * | 12/1995 | Shoda | 144/252.1 |
| 5,487,629 A | * | 1/1996 | Watanabe | 409/137 |
| 6,019,599 A | * | 2/2000 | Volcker et al. | 433/29 |
| 6,516,992 B1 | * | 2/2003 | Colligan | 228/112.1 |

FOREIGN PATENT DOCUMENTS

DE          3800050 A1 * 7/1988
WO   WO-98/36869 A1 * 8/1998

\* cited by examiner

*Primary Examiner*—Erica Cadugan
(74) *Attorney, Agent, or Firm*—Timothy J. Klima

(57) ABSTRACT

An extractor device for machine tools which have at least one tool-holder machining head has an annular blowing distributor for generating a tubular gaseous barrier around the tool-holder machining head, and an annular extractor manifold, positioned inside the barrier and concentric with the annular blowing distributor, for extracting shavings and/or dusts created by machining confined in the barrier.

11 Claims, 2 Drawing Sheets

EXTRACTOR DEVICE FOR MACHINE TOOLS, WELDING AND MANUFACTURING MACHINES AND THE LIKE

This application claims priority to Italy Patent Application No. BO2006A 000415, filed May 26, 2006, which application is incorporated by reference herein.

BACKGROUND OF THE INVENTION

The present invention relates to an extractor device for machine tools, welding and manufacturing machines and the like.

In particular, the present invention relates to an extractor device designed to be installed on the machining heads of machine tools to remove shavings and dusts from the machining area, or, for example, on welding torches for removing and extracting the fumes and vapors from the welding area, without in any way limiting the scope of the invention.

As is known, in stock removal machining processes machining waste is flung far from the area of action of the tool due to the high speed of tool rotation.

A known solution for keeping the machining area and the surrounding area clean is to convey and collect shavings and dusts in special channels by means of extractor outlets positioned close to the tools which perform the machining. Said outlets have the disadvantage of not being able to be moved towards the machining point past a predetermined limit, both due to the shape, often irregular, of the workpiece being machined, and due to the variability of the dimensions of the various tools which may be used one after another during the machining cycle. The direct consequence of this is inefficient shavings extraction, since the extracting action is noticeably reduced with an increase in the distance from the machining point. In practice, only a minimum part of the lightest or even dusty shavings, such as those produced by machining wood or polymers, are extracted.

This disadvantage was at least partly eliminated by substituting the outlets with an extractor hood which surrounds and encloses the tool. In technical solutions of this type the hood is usually interchangeable, so that on each occasion the hood with the most suitable dimensions can be mounted around the tool.

However, even hoods cannot be moved towards the machining point beyond a predetermined limit, to prevent them from striking the surface being machined, above all in the cases in which said surface is very irregular. For this reason improved hoods were developed, on the lower edge of which an annular brush, or an annular flexible strip is mounted, which, skimming the surface being machined, improves the extraction seal. However, in practice, it was found that both the brushes and the strips tend to wear or deform easily, compromising the efficiency of the extractor device on which they are mounted. This means that they need substituting periodically, involving costs both for materials and labor.

Very similar and equivalent problems are also found for other manufacturing or welding machines, for example for extracting and removing from the welding area any fumes and vapors produced by welding.

SUMMARY OF THE INVENTION

The aim of the present invention is to produce an extractor device for machine tools, welding and manufacturing machines and the like which is free of the above-mentioned disadvantages.

Accordingly, the present invention provides an extractor device for machine tools, welding and manufacturing machines and the like comprising the features described in any of the claims herein.

BRIEF DESCRIPTION OF THE DRAWINGS

The present invention is now described, by way of example and without limiting the scope of application, with reference to the accompanying drawings, in which.

DESCRIPTION OF THE PREFERRED EMBODIMENTS

Figure 1:
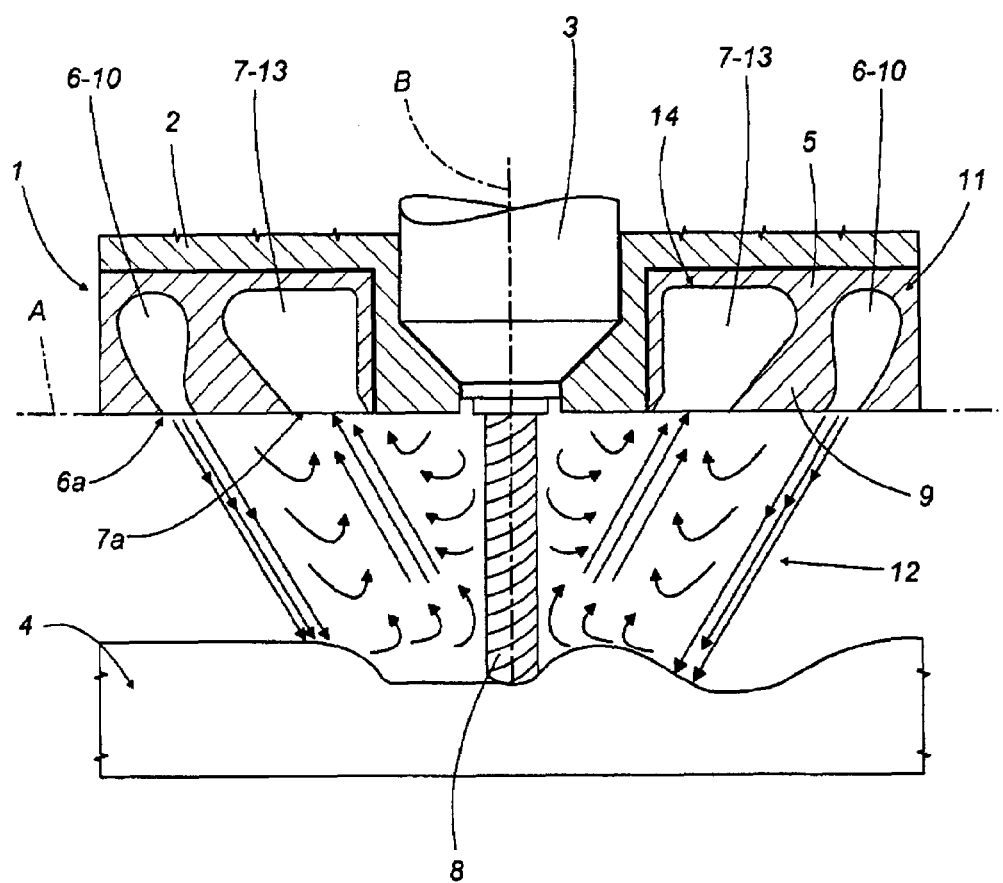
FIG. 1 is a schematic cross-section of an extractor device for machine tools, made in accordance with the present invention and associated with a tool-holder machining head.
Figure 2:
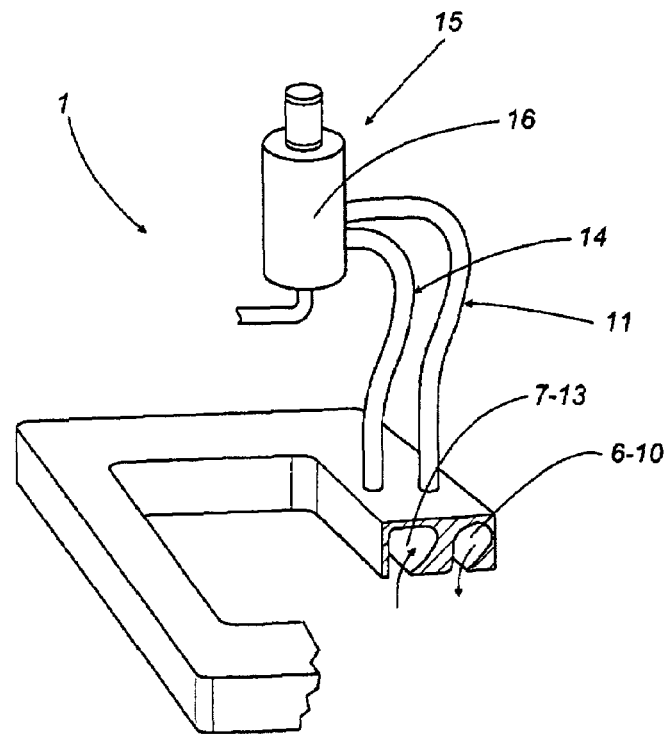
FIG. 2 is a perspective view with some parts cut away for clarity, of the extractor device of FIG. 1.

In FIGS. 1 and 2 the numeral 1 denotes as a whole an extractor device for machine tools. In particular, FIG. 1 shows the device 1 mounted, using an annular supporting flange 2, on a tool-holder machining head 3, designed to perform stock removal machining processes on a semi-finished product 4.

The device 1 comprises an interchangeable annular 5 body, mounted on the flange 2 and having, on the side facing the semi-finished product 4, two annular cavities 6 and 7, coaxial with one another, having the shape of a groove and substantially coplanar, that is to say, having respective annular openings 6a and 7a lying in the same plane A.

The plane A is at a right angle to the axis of rotation B of the tool 8 mounted on the machining head 3. The axis B is also the central axis about which the openings 6a and 7a extend concentrically and is also, according to at least one plane at a right angle to the plane A, an axis of symmetry for the body 5 and, in particular, for the cavities 6 and 7.

The outside of the cavity 7 is surrounded by the cavity 6 and the cavity 7 in turn surrounds the outside of the tool-holder machining head 3. A separator 9 with constant cross-section separates the cavities 6 and 7 and the respective openings 6a and 7a. In other words, the outside of the opening 7a is surrounded by the opening 6a at a constant distance along the whole perimetral extension of the cavities 6 and 7.

As illustrated for example in FIG. 2, the body 5 and the cavities 6 and 7 extend according to a quadrangular path. However, according to alternative embodiments, not illustrated, they may extend according to paths which have various shapes, for example circular.

The cavity 6 forms an annular blowing distributor 10 controlled by a first pneumatic circuit 11 for generating a tubular gaseous barrier 12 surrounding the outside of the tool-holder machining head 3, whilst the cavity 7 forms an extractor outlet, in the case in question an annular extractor manifold 13, controlled by a second pneumatic circuit 14 and communicating with the region whose perimeter is delimited by the barrier 12 for extracting shavings and/or dusts created by machining confined in the barrier 12.

Relative to the barrier 12, the distributor 10 generates, point by point along its annular extension, a gaseous flow, in particular an air flow, angled towards the semi-finished product 4 and converging towards the axis B. In the specific example, in which the cavity 6 extends according to a quadrangular path, the barrier 12 is a gaseous confinement hood having a shape substantially comparable to the lateral surface of a truncated pyramid with quadrangular base, with the small base facing the semi-finished product 4.

As illustrated in FIG. 2, the device 1 also comprises a circuit 15 for recirculating the air blown by the distributor 10 and extracted by the manifold 13. The recirculating circuit 15 comprises a filter 16, for example a cyclone separator, for separating machining shavings and/or dusts from the air extracted by the manifold 13.

As the above description makes obvious, the extractor device disclosed allows effective removal of shavings and/or dusts created by machining and does not involve any problems with wear, since the gaseous barrier 12 forms a confinement hood designed to strike the semi-finished product 4, naturally adapting to its profile.

Moreover, it should be noticed that the twin air flow, generated by blowing by the distributor 10 and by the simultaneous extraction by the manifold 13, produces a turbulence inside the barrier 12 which, on one hand, facilitates extraction of shavings and, on the other hand, tends to keep the machining head 3 clean in the area in which it supports the tool 8. This effect is promoted by the fact that the shavings, striking the angled walls of the barrier 12, are diverted, and above all drawn, towards the machining surface, where a turbulent motion is triggered, which slows them down. Finally, from the machining surface the shavings regain speed, in an upward motion which substantially does not involve the machining head 3, and they are drawn, together with the air, by the manifold 13.

Figure 3:
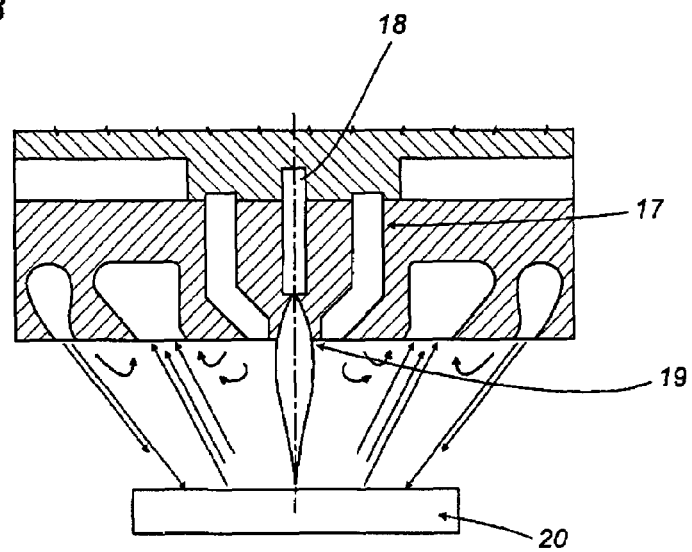
FIG. 3 is a schematic cross-section of another application of the device of FIG. 1.

The solution illustrated in FIG. 3 differs from that of FIG. 1 only in that the tool-holder machining head 3 and the tool 8 are substituted by a welding torch 17 comprising an electrode 18 and a nozzle 19 whilst the semi-finished product 4 is substituted by a part to be welded 20. It should be noticed that the welding torch 17 can be likened, at least for this type of invention, to the tool-holder machining head 3 and the electrode 18 with the nozzle 19 can be likened to the tool 8.

Again in this case, the extractor device disclosed allows effective removal of the vapors and fumes, as well as dusts generated during the welding step and does not have any problems with wear, since, similarly to what was said regarding the case illustrated in FIG. 1, the gaseous barrier 12 forms a confinement hood designed to strike the part 19 to be welded, naturally adapting to its profile and the double air flow, generated by blowing by the distributor 10 and simultaneous extraction by the manifold 13, produces a turbulence inside the barrier 12 which has the same advantages as described above.

What is claimed is:

1. An extractor device for machine tools, welding, and/or manufacturing machines which have at least one tool-holder machining head, the device comprising first pneumatic means for generating a tubular gaseous barrier surrounding the outside of the tool-holder head, and second pneumatic annular means, concentric with the first pneumatic means, for extracting shavings and/or dusts created by machining confined in the barrier, and wherein the first and second pneumatic means are substantially coextensive along a central axis of the first and second pneumatic means.

2. The extractor device according to claim 1, wherein the first pneumatic means comprise an annular blowing distributor, surrounding the outside of the tool-holder head and designed to generate said barrier; the second pneumatic means comprising an extractor outlet, communicating with the region whose perimeter is delimited by the barrier.

3. The extractor device according to claim 2, wherein the extractor outlet includes an annular extractor manifold, the outside of which is surrounded by the annular blowing distributor, the extractor manifold itself surrounding the outside of the tool-holder head.

4. The extractor device according to claim 3, wherein the annular blowing distributor and the annular extractor manifold are coaxial with one another and substantially coplanar.

5. The extractor device according to claim 4, wherein the annular blowing distributor and the annular extractor manifold include two respective annular cavities made in a single annular body, which can be mounted on the tool-holder head.

6. The extractor device according to claim 3, wherein the annular blowing distributor extends around the central axis and generates, point by point along its annular extension, a gaseous flow converging towards the axis.

7. The extractor device according to claim 6, wherein the central axis is, according to at least one plane, an axis of symmetry for the annular blowing distributor.

8. The extractor device according to claim 3, comprising a circuit for recirculating the gas blown by the annular blowing distributor and extracted by the annular extractor manifold.

9. The extractor device according to claim 8, wherein the recirculating circuit comprises a filter for separating machining shavings and/or dusts from the gas extracted by the annular extractor manifold.

10. The extractor device according to claim 3, wherein the gas blown by the annular blowing distributor and extracted by the annular extractor manifold is air.

11. An extractor device for machine tools having at least one tool-holder machining head, the device comprising an annular blowing distributor for generating a tubular gaseous barrier around the tool-holder machining head, and an annular extractor manifold, positioned inside the barrier and concentric with the annular blowing distributor, for extracting shavings and/or dusts created by machining confined in the barrier, and wherein the annular blowing distributor and the annular extractor manifold are substantially coextensive along a central axis of the annular blower distributor and the annular extractor manifold.

* * * * *